2 Sheets—Sheet 1.

G. GEER.

Corn Harvester.

No. 2,440.

Reissued Jan'y 1, 1867.

Witnesses:
A. Holcombe
G. W. Reed

Inventor:
Geo. Geer
per Munn & Co
Attorneys

N. PETERS, Photo-Lithographer, Washington, D. C.

2 Sheets—Sheet 2.

G. GEER.

Corn Harvester.

No. 2,440.

Reissued Jan'y 1, 1867.

Witnesses:
E. Coombs
G. W. Reed.

Inventor
Geo Geer
per Munn & Co
Attorneys.

N. PETERS. Photo-Lithographer, Washington, D. C.

United States Patent Office.

GEORGE GEER, OF DOUGLAS, ILLINOIS.

*Letters Patent No.* 38,738, *dated June* 2, 1863; *reissue No.* 2,440, *dated January* 1, 1867.

IMPROVEMENT IN CORN-HARVESTERS.

The Schedule referred to in these Letters Patent and making part of the same.

TO ALL WHOM IT MAY CONCERN:

Be it known that I, GEORGE GEER, of Douglas, in the county of Knox, and State of Illinois, have invented a new and improved Corn-Harvester; and I do hereby declare that the following is a full, clear, and exact description of the same, reference being had to the accompanying drawings, making a part of this specification, in which—

Figure 4:
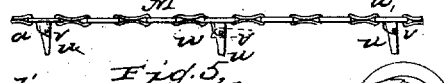

Figure 4, a detached view of a portion of an endless chain pertaining to the same.

Figure 1:
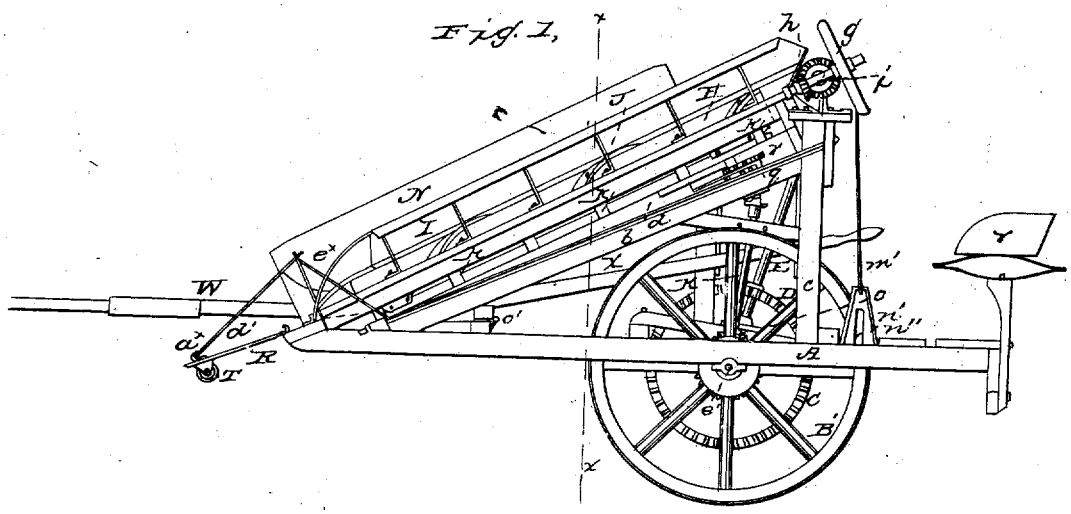
Figure 1 is a side view of my invention.
Figure 5:
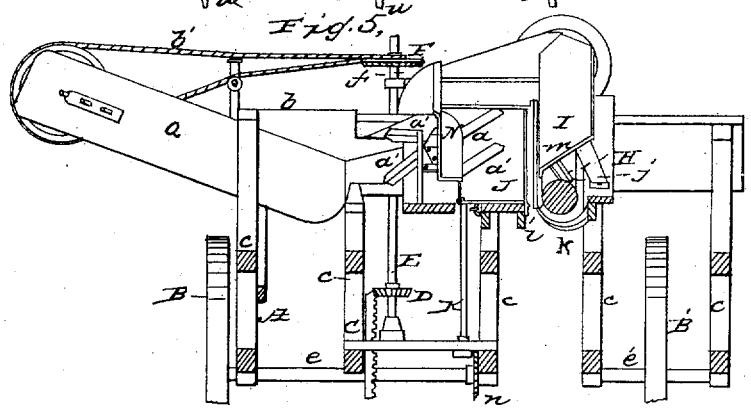

Figure 5, a transverse section of the invention taken in the line *x x*, fig. 1.

Similar letters of reference indicate corresponding parts in the several figures.

This invention relates to a new and improved machine for gathering ears of corn from the standing stalks; and it consists in the employment or use of a revolving cylinder, provided with a spiral rib, and fitted between guards, and using in connection therewith two endless chains, guide-plates, and a cutter, all arranged as hereinafter shown and described, and fitted upon a mounted frame so as to operate in a perfect manner to effect the desired end.

To enable those skilled in the art to fully understand and construct my invention, I will proceed to describe it.

Figure 2:
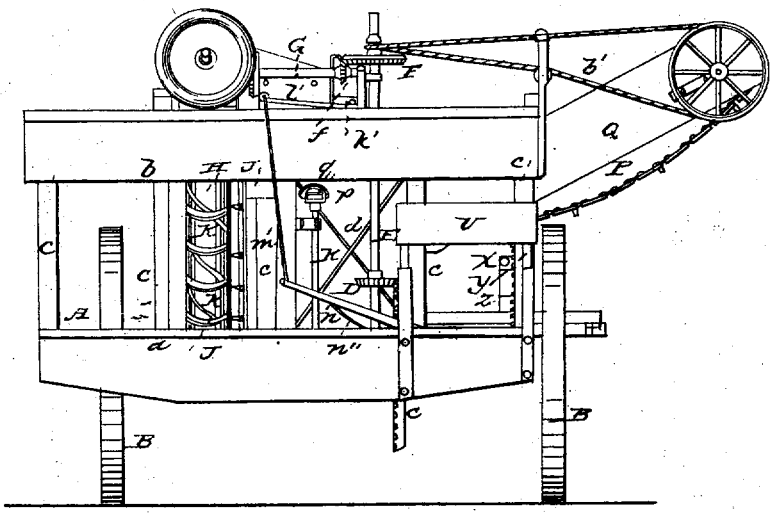
Figure 2 is a back view of the same.
Figure 3:
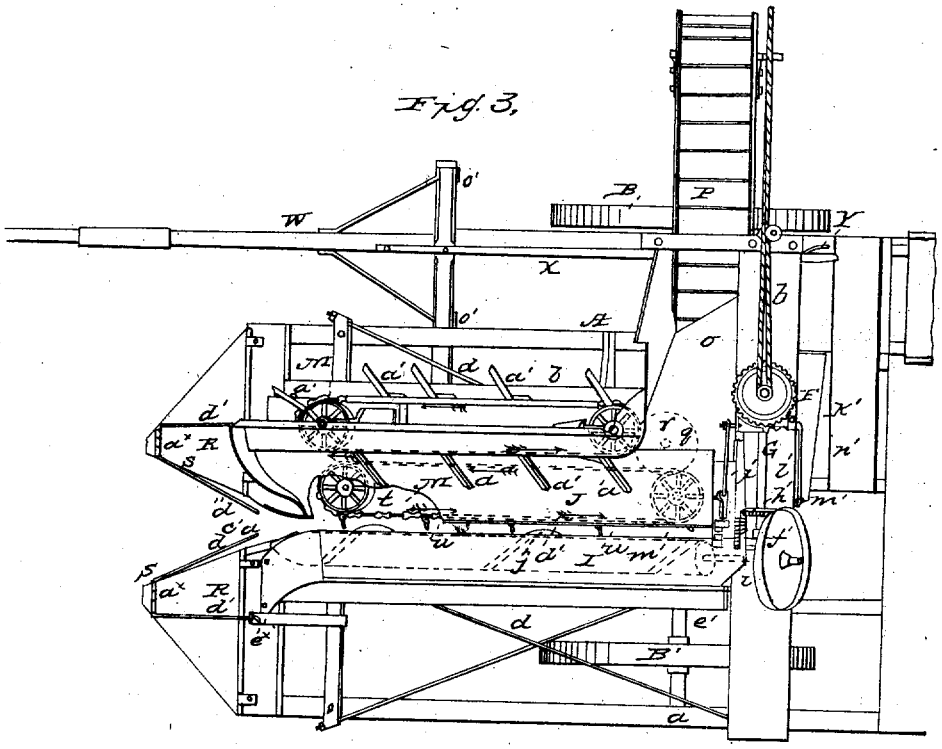
Figure 3 is a plan or top view of the same.

A represents a frame, which is composed of two principal parts, *a b*, the part *b* having an inclined position, its front end being connected with *a* and its back end supported at a suitable height therefrom by uprights *c*. Each part of the frame A is formed of parallel bars connected by cross-ties; the upper part *b*, however, is braced and strengthened by diagonal rods *d*, (see figs. 2 and 3.) The frame A is mounted on two wheels B B′, which are fitted on independent axles *e e′*. The wheel B is the driving-wheel, and on its axle *e* there is placed a toothed-wheel, C, which gears into a pinion, D, on a shaft, E, the latter having a bevel-wheel, F, on its upper end, into which a bevel-pinion, *f*, on a horizontal shaft, G, gears. On this shaft G there is also placed a bevel-pinion, *g*, which gears into a corresponding pinion, *h*, on the shaft *i* of a cylinder H, which is fitted in the part *b* of the frame A, and has the same inclined position as said part. This cylinder H is encompassed by a spiral rib, *j*, which is attached to its periphery and has a position thereon like the thread of a screw, (see figs. 1, 2, 3, and 4.) Over the cylinder H, and extending its whole length, there is a plate, I, which has an inclined position in its transverse section. Directly below the cylinder H there are a series of semicircular bars, *k*, which have a transverse position relatively with the cylinder H, and which have a bar, *l*, attached to their inner ends, said bar extending the whole length of the cylinder H. The plate I and semicircular bars *k*, it will be understood, are attached to the part *b* of the frame A, and not connected with the cylinder H, (see fig. 5.) The plate I performs an important function, preventing the ears of corn from coming in contact with the cylinder H until they reach a proper position to be picked off from the standing stalks by the spiral rib *j* on cylinder H. J is a plate, which is attached to the part *b* of the frame A, and is about in line with the axis of the cylinder H and parallel with it, a space, *m*, being allowed between said plate J and cylinder H. On the axle *e* of the wheel B there is placed a bevel-wheel, *n*, which gears into a pinion, *o*, on a shaft, K, the upper part of which is connected by an universal joint, *p*, with a shaft, *q*, which has a toothed-wheel, *r*, upon it, said wheel *r* gearing into two wheels which drive two endless chains, L M, the latter passing around wheels *t t*, on the part *b* of the frame A, (see fig. 3.) The endless chain M extends nearly the whole length of the plate J, the former being underneath the latter, and, at its inner edge, by the side of the space *m*. This chain M has a series of teeth, *n*, attached to it by pivots *v*, which pass through lips W, the latter being secured to the chain. The teeth *n* are secured to the lips W in such a manner that they may turn forward or towards the back end of the machine, but not towards the front end thereof. The teeth, when turned backward to their fullest extent, are at right angles to the chain M, and project into the space *m* and extend nearly across it, (see fig. 3.) The endless chain L has a series of arms, *a′*, attached obliquely to it at suitable and equal distances apart, as also shown in fig. 3. These arms *a′*, as the chain L moves, travel over the upper surface of the plate J. N is an upright plate, which is attached to the plate J, and extends nearly its whole length, said plate N preventing the ears of corn from flying away as they are stripped from the standing stalks by the ribbed cylinder H, and to the back part of the plate J there is secured at right angles an inclined plate O, which serves to conduct the ears of corn upon the lower end of an endless carrier, P, which is placed in a box or case, Q, attached at right angles to the back part of the frame and projecting from it at one side. This endless carrier may be driven by a belt, $b'$, from the shaft E. To the front end of the frame A there are attached, by hinges or joints, two V-shaped plates, R R. The space $c'$ between these plates is also of V form, wider at its front than at its back end, (see fig. 3,) and said space is in line with the space $m$, between the plate J and cylinder H, the lower end of the plate J being slightly rounded and the lower end of the cylinder H being made of conical form, so as to cause the lower end of the space $m$ to gradually conform to the width of the back part of the space $c'$ between the plates R R. To each plate R there is attached, by a joint, $u^{\times}$, a bent rod, $s$, the form of which is shown clearly in fig. 3. One side, $d'$, of these rods pass through plates $e^{\times}$ attached to the frame A, and are allowed to slide freely therein, and the other sides, $d''$, project a trifle over the sides of the space $c'$ a short distance above the plates R, as shown in fig. 1. To the under side of each plate R, near its front end, there is attached a roller, T. At the back end of space $m$ there are placed two serrated wheels, $f' f'$, which are rotated by gearing from a wheel $h'$ on the shaft G, (see fig. 3;) and at the back part of the plate J there is placed a cutter, U, said cutter being fitted in a suitable guide and connected by a rod, $i'$, to a shaft, $j'$, on a shaft, $k'$, the latter having an arm, $l'$, projecting at right angles from its back end, which arm is connected by a rod, $m'$, with a treadle, $n'$, the latter having a spring, $n''$, underneath it, and being within reach of the driver's seat, V, on the back part of the frame A. W is the draught-pole, which is attached by joints or hinges $o'$ to the right-hand side of the front part of the frame A.

The operation is as follows:

The machine is drawn along so that the team will walk, one animal at each side of a row of corn previously operated upon and the space $m$ be in line with the row to be operated upon. The endless chains L M move in the direction indicated by the red arrows 1, and the cylinder H rotates in the direction indicated by the red arrow 2. The plates R R, as the machine is drawn along, pass under and will gather up the lodged or fallen stalks, and will guide them into the space $m$, said operation being greatly assisted by the parts or sides $d''$ of the bent rods S. The cylinder H, with its spiral rib $j$, strips the ears of corn from the stalks, the ears being turned over on the plate J in consequence of the ears being of larger diameter than the stalks. The arms $a'$ of the chain L carry the detached ears up the plate J and discharge them on the inclined plate O, the latter conducting them on the endless carrier P, which discharges them from the machine into any proper receptacle or conveyance prepared to receive them. The bar $l$, as well as the plate I, prevents the stalks from crowding against the cylinder H. The endless chain M performs an important function, to wit, in the operation of this machine there will always be more or less stalks torn up by the roots, and some stalks will be broken off above the ground. The teeth $u$ of the chain M catch these stalks and carry them up to the back part of the space $m$, where they are cut off by the cutter U, the latter being operated by an attendant, who presses down the treadle $n'$ with his foot. The stalks are drawn down through the back part of the space $m$ by the serrated wheels $f' f'$ The endless chain M revolves slower than the machine travels or moves over the surface of the ground, and consequently the teeth $u$ of said chain should be allowed to turn forward to allow the standing stalks to pass them. The proportion of eradicated and broken stalks will of course be small in comparison with the standing stalks operated upon.

Having thus described my invention, what I claim as new, and desire to secure by Letters Patent, is—

1. The endless chain M provided with pivoted-teeth $n$, substantially as and for the purpose set forth.
2. The serrated wheels $f' f'$, arranged and applied to operate as and for the purpose specified.
3. The cutter U operated by the treadle $n'$, and arranged and applied as and for the purpose set forth.
4. The bar or guard $l$ arranged and applied underneath the cylinder H, substantially as and for the purpose set forth.
5. The plate or guard N attached to the plate J, as and for the purpose specified.

GEORGE GEER.

Witnesses:

H. M. HALE,
LOYAL C. FIELD.